(12) United States Patent
Santucci et al.

(10) Patent No.: US 9,120,395 B2
(45) Date of Patent: Sep. 1, 2015

(54) METHOD AND ELECTRONIC SYSTEM FOR THE AUTOMATIC MANAGEMENT OF THE ENERGY AUTONOMY OF A VEHICLE PARTICULARLY OF ELECTRIC VEHICLES

(75) Inventors: Mario Santucci, Florence (IT); Onorino Di Tanna, Rome (IT); Sergio Savaresi, Cremona (IT); Mara Tanelli, Lodi (IT); Andrea Dardanelli, Milan (IT); Bruno Picasso, Rho (IT)

(73) Assignee: PIAGGIO & C. S.p.A., Pontedera (IT)

( * ) Notice: Subject to any disclaimer, the term of this patent is extended or adjusted under 35 U.S.C. 154(b) by 0 days.

(21) Appl. No.: 13/985,609

(22) PCT Filed: Mar. 8, 2012

(86) PCT No.: PCT/IB2012/051090
§ 371 (c)(1),
(2), (4) Date: Oct. 21, 2013

(87) PCT Pub. No.: WO2012/123862
PCT Pub. Date: Sep. 20, 2012

(65) Prior Publication Data
US 2014/0046528 A1      Feb. 13, 2014

(30) Foreign Application Priority Data

Mar. 11, 2011 (IT) .............................. MI2011A0393

(51) Int. Cl.
*B60L 15/20* (2006.01)
*B60L 11/18* (2006.01)
*B60L 15/02* (2006.01)

(52) U.S. Cl.
CPC ......... *B60L 15/2045* (2013.01); *B60L 11/1861* (2013.01); *B60L 15/025* (2013.01);
(Continued)

(58) Field of Classification Search
CPC ............ B60L 15/2045; B60L 11/1861; B60L 15/025; B60L 2240/70; B60L 2240/60; B60L 2240/12; B60L 2260/52; B60L 2240/14; Y02T 10/7258; Y02T 10/7291; Y02T 90/16; Y02T 10/7044; Y02T 90/161; Y02T 10/7005; Y02T 10/705; Y02T 10/643
USPC .......................................................... 701/22
See application file for complete search history.

(56) References Cited

U.S. PATENT DOCUMENTS 5,778,326 A    7/1998 Moroto et al.
2010/0131139 A1    5/2010 Sakai et al.

FOREIGN PATENT DOCUMENTS

EP    0829389 A2    3/1998
EP    0962352 A2    12/1999
EP    1925494 A2    5/2008

OTHER PUBLICATIONS

International Search Report issued in corresponding International Patent Application No. PCT/IB2012/051090 dated Jan. 31, 2013 (4 pages).

*Primary Examiner* — Mary Cheung
*Assistant Examiner* — Anne Mazzara
(74) *Attorney, Agent, or Firm* — Kilyk & Bowersox, P.L.L.C.

(57) ABSTRACT

A method is described for the automatic management of the energy autonomy of a vehicle, and includes receiving a signal for indicating a distance and/or a path to cover, and dividing the distance and/or the path into space intervals; calculating an allowable variation of energy capacity in a space interval based on energy capacity detected by the sensors and on variation laws of the energy capacity; determining limit conditions for the speed and/or acceleration of the vehicle, on the basis of a map, chosen among a plurality of maps of speed-acceleration-variation of energy capacity; generating a regulated instantaneous torque request on the basis of the speed and/or acceleration detected by the plurality of sensors, of the determined limit conditions for the speed and/or acceleration and of the instantaneous torque request generated by the first central control unit. An electronic system capable of implementing such a method is described.

16 Claims, 6 Drawing Sheets

(52) U.S. Cl.
CPC ...... *B60L2240/12* (2013.01); *B60L 2240/14* (2013.01); *B60L 2240/60* (2013.01); *B60L 2240/70* (2013.01); *B60L 2260/52* (2013.01); *Y02T 10/643* (2013.01); *Y02T 10/705* (2013.01); *Y02T 10/7005* (2013.01); *Y02T 10/7044* (2013.01); *Y02T 10/7258* (2013.01); *Y02T 10/7291* (2013.01); *Y02T 90/16* (2013.01); *Y02T 90/161* (2013.01)

METHOD AND ELECTRONIC SYSTEM FOR THE AUTOMATIC MANAGEMENT OF THE ENERGY AUTONOMY OF A VEHICLE PARTICULARLY OF ELECTRIC VEHICLES

This application is a National Stage Application of PCT/IB2012/051090, filed Mar. 8, 2012, which claims priority to Italian Patent Application No. MI2011A000393, filed Mar. 11, 2011.

The present invention refers to a method and to an electronic system for the automatic management of the energy autonomy of a vehicle, which is particularly, but not exclusively used in electric vehicles.

Nowadays, the fact that non renewable energy sources are finite has led to the definition of objectives concerning sustainable mobility which, in general, tend to incentivise both the development of vehicles with low carbon footprint or with zero emission, and the definition of new models of use of the vehicles themselves, which make it necessary to modify and to rationalise their use.

For such a purpose, it is known to design and manufacture, on a large scale, vehicles with electric propulsion which, over the years, have established themselves on the market as a valid alternative to thermal propulsion vehicles and that seem to constitute the technological platform to be promoted in order to develop new models of mobility.

However, the spreading of known electric propulsion vehicles is strongly conditioned by the limited autonomy of the battery and by the shortage of stations in which the battery itself can be charged.

In detail, the batteries used today in electric vehicles are notoriously very costly, as well as very large and heavy, since they must ensure an energy supply such as to produce suitable performances in terms of acceleration and speed, especially when driving in the city.

It should be clear that the autonomy of such batteries decreases as the average speed of the vehicle and of the accelerations which it undergoes increases; consequently, the autonomy of an electric vehicle expressed in terms of maximum distance that can be achieved varies in function of the characteristics of the section of road and of the driving style of the driver.

In cities, the autonomy is for example influenced by the amount and by the type of braking and by the relative accelerations. In the same way, the slopes on the road affect it, even positively, if the vehicle is equipped with systems for recovering braking energy, or rather downhill.

This means that although known electric propulsion vehicles are capable of providing an indication of the load state of the battery and consequently an indication of the distance that can be travelled by it based upon a hypothesis of average consumption, the generic user cannot always be certain of reaching his destination, since it is not possible to foresee traffic conditions and the conditions of the road surface.

It is moreover important to underline that the recharging points are currently scattered over national and international territory in a manner that is far from widespread and the recharging time is notoriously very long.

The drawbacks highlighted above create a big inconvenience for consumers and do not allow them to develop faith in this new technological platform for sustainable mobility, thus decisively being an obstacle to its spreading.

The purpose of the present invention is that of avoiding the aforementioned drawbacks and, in particular, that of devising a method for the automatic management of the energy autonomy of a vehicle while driving.

Another purpose of the present invention is that of providing a method for the automatic management of the energy autonomy of a vehicle that is capable of ensuring that a journey is completed.

A further purpose of the present invention is that of making an electronic system for the automatic management of the energy autonomy of a vehicle that is capable of providing information concerning whether the energy on board is sufficient for a certain journey.

Yet another purpose of the present invention is that of creating an electronic system for the automatic management of the energy autonomy of a vehicle which makes it possible to modify the dynamic response of a vehicle by managing the uncertainties concerning the variable and unknown traffic conditions.

These and other purposes according to the present invention are achieved by making a method and an electronic system for the automatic management of the energy autonomy of a vehicle as outlined in the independent claims 1 and 9.

Further characteristics of the method and of the electronic system for the automatic management of the energy autonomy of a vehicle are object of the dependent claims.

The characteristics and the advantages of a method and of an electronic system for the automatic management of the energy autonomy of a vehicle according to the present invention shall become clearer from the following description, given as an example and not for limiting purposes, with reference to the attached schematic drawings, in which.

Figure 1:
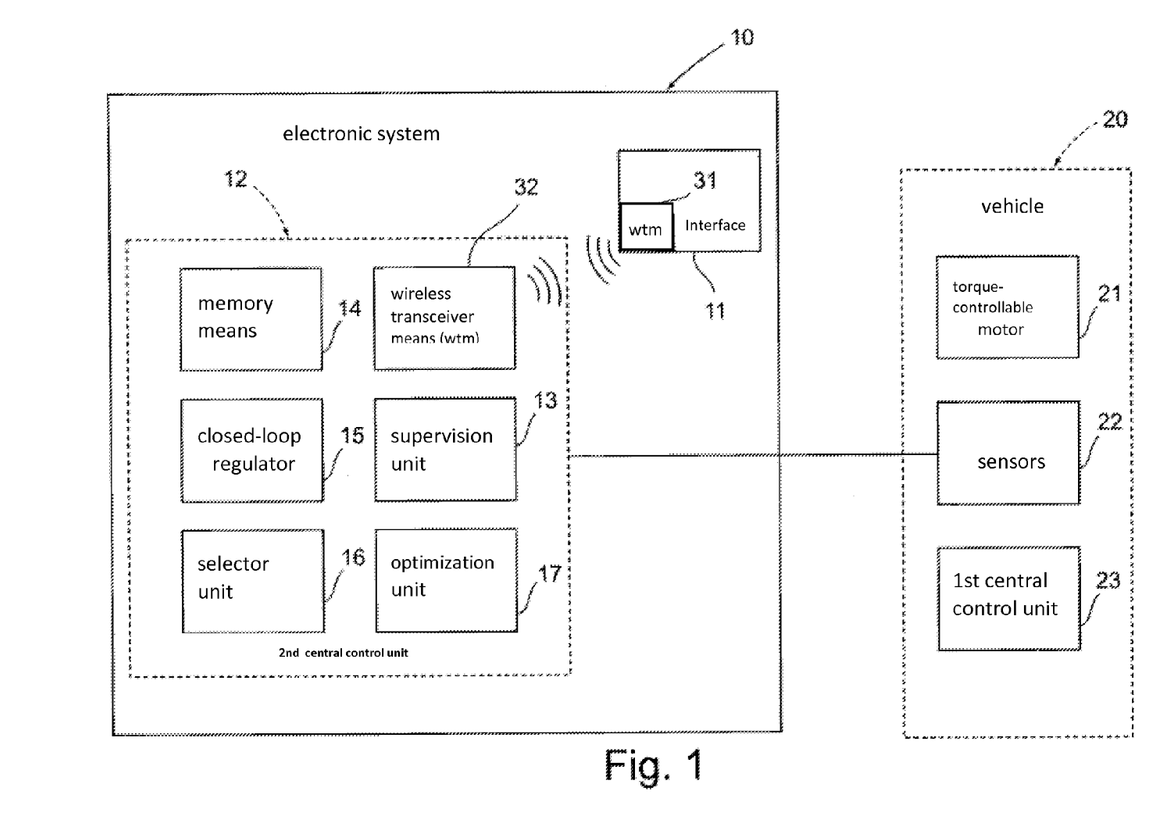
FIG. 1 is a block diagram of an electronic system for the automatic management of the energy autonomy of a vehicle according to the present invention.

With reference to the figures, an electronic system for the automatic management of the energy autonomy of a vehicle is shown, wholly indicated with reference numeral 10. Such an electronic system 10 is advantageously coupled with a vehicle 20 of the type comprising a torque-controllable motor 21 and a plurality of sensors 22 for the instantaneous measurement of a plurality of drive parameters and of energy capacity of the vehicle 20 itself. In detail, the torque-controllable motor 21 can be either of the electric type, or of the thermal type. The electronic system 10 is also associated with a vehicle 20 equipped with a data network, preferably a CAN type bus, which is capable of transmitting digital and/or analog signals.

In any case, the vehicle 20 is furthermore equipped with a first central control unit 23, coupled with the motor 21, capable of generating an instantaneous torque request $m_d$ on the basis of a request of a user made by means of the accelerator. The translation is carried out by means of maps that relate the position of the accelerator, the gear inserted and the number of revs of the motor to the requested torque.

The plurality of sensors 22 is capable, in particular, of detecting the speed, the acceleration and the energy capacity C of the vehicle 20. Such an energy capacity C refers to the load state $\xi$ of a battery of an electric motor (hence $C=\xi$)

and/or to the energy capacity of a tank of fuel $C_{FUEL}$ of a thermal engine (hence $C=C_{FUEL}$), according to the nature of the torque-controllable motor 21.

The electronic system 10 for the automatic management of the energy autonomy of a vehicle comprises a user interface means 11 that is connected to a second central control unit 12 that is integrated in the vehicle 20.

Such a connection is preferably made wirelessly by means of two wireless transceiver means 31, 32 of which the first 31 ("wtm") is associated to the interface means 11 and the second 32 is associated to the second central control unit 12, respectively. Alternatively, the interface means 11 is integrated in the vehicle 20 allowing a cabled connection with the second central control unit 12.

In any case, the interface means 11 is capable of transmitting a signal for indicating a distance and/or a path to cover by the user himself. In the rest of the description reference is made to the path as an example and not for limiting purposes.

Preferably, such an interface means 11 is a mobile terminal that is capable of communicating with the second central control unit 12 according to Bluetooth standards, like for example a smartphone equipped with GPS or a satellite navigation device. Such an interface means 11 further comprises memory means (not illustrated) in which road maps and possibly also corresponding altimetric data and software means (not illustrated) are registered, adapted to generate the signal for indicating a path on the basis of such maps and of the requirements of the user.

The user can, therefore, advantageously send, to the second central control unit 12, a signal for indicating a path to cover specifying the starting and end points and/or selecting a particular path from those that connect them. In the case in which in the memory means of the interface means 11 also the altimetric data relative to the desired path are memorised, such data can be sent to the second central control unit 12.

According to the present invention, the second central control unit 12 is capable of generating a regulated instantaneous torque request m on the basis of the indicated distance and/or path to cover, on the basis of the speed and/or acceleration and energy capacity C of the torque-controllable motor 21 detected by the plurality of sensors 22, as well as on the basis of the instantaneous torque request $m_d$ generated by the first central control unit 23.

In detail, the second central control unit 12 receives the signal for indicating the path and divides such a path in a plurality of space intervals. Such a second central control unit 12 comprises a supervision unit 13 capable of calculating, in real time and at the initial point of each interval among the plurality of space intervals, the allowable variation of energy capacity ΔC of the motor 21, on the basis of values of energy capacity C detected by the plurality of sensors 22.

Alternatively, the supervision unit 13 can be comprised in the interface means 11, or such a supervision unit 13 of the interface means 11 can be a supervision unit that is additional with respect to the supervision unit 13 of the second central control unit 12.

In any case, the supervision unit 13 calculates the allowable variation of energy capacity ΔC, i.e. the value of energy capacity C that can be consumed whilst travelling a space interval so as to ensure the energy autonomy of the motor 21 for the entire length of the path set by the user.

According to the type of roads that make up the path (city roads, highways, extra-urban roads) and to the altimetric profile related to them, the supervision unit 13 can generate different values of energy capacity C which can be consumed for each space interval of the path itself. For example, the supervision unit 13 can generate values that are higher in the case in which there are up-hill portions and lower in the case in which there are down-hill portions; in the same way, on a highway such a supervision unit 13 can generate values corresponding to minimum average journey speed, possibly set by the user by means of the interface means 11.

In such a way, it is possible to take into account the higher or lower consumption related to the foreseen conditions of use and improve the efficiency of the electronic system 10 for the automatic management of the energy autonomy of a vehicle.

It is important to underline that in the moment in which the user sets the path which he desires to cover, the supervision unit 13 verifies the coherence between the length of the indicated path and the detected energy capacity C and if this is insufficient, it generates a warning signal which is sent from the second control unit 12 to the interface means 11 so as to warn the user of the limited energy autonomy.

Preferably, the interface means 11 comprises video and/or audio means (not illustrated) for playing the warning signal emitted by the second central control unit 12.

Moreover, in the case in which the user sends the altimetric data relative to the particular path he desires to cover through the interface means 11, it is possible to take into account both the consumption in excess caused by the up-hill portions, and the reduction thereof that is made possible by possible down-hill phases.

Moreover, if the torque-controllable motor 21 is an electric motor and the vehicle is equipped with any means for regenerating the load, the possible reloading carried out by such means in a space interval is detected by the plurality of sensors 22; in such a way, the calculation of the allowable variation of the energy capacity ΔC is carried out by taking also into account such possible reloads, possibly making the speed and acceleration constraints less strict.

The second central control unit 12 further comprises an optimization unit 17 that is capable of determining limit conditions for the speed and/or acceleration that the vehicle 20 must meet within the nearest space interval, on the basis of a plurality of speed-acceleration-energy capacity variation maps which relate the speed and the acceleration of the vehicle 20 to the allowable variation of calculated energy capacity.

In detail, the optimization unit 17 interacts with the supervision unit 13 from which it receives the value of energy capacity that can be consumed in the space interval to be covered and therefore the allowable variation of energy capacity ΔC. The optimization unit 17 implements a controller R(s) that is capable of regulating the energy capacity C of the vehicle. Such a controller R(s) determines the limit conditions for the speed and/or acceleration that the vehicle 20 must respect within the nearest space interval, on the basis of a plurality of speed-acceleration-energy capacity variation maps. Such a controller R(s) is designed on the basis of suitable mathematical models of the dynamic behaviour of the vehicle, so as to ensure that there is no error when the transient has finished. The control loop is closed with a low passband with respect to the inertial dynamics of the vehicle. For example, in the case of an electric vehicle for urban use, such a controller R(s) can be calibrated so that the closed-loop system has a passband of around 0.01 Hz.

The plurality of maps of speed-acceleration-energy capacity variation is registered in memory means 14 that are comprised in the second central control unit 12 and that are connected to the optimization unit 17; it is worth underlining moreover that variable level curves can be derived from the speed-acceleration-energy capacity variation maps in function of the allowable variation in energy capacity ΔC.

The second central control unit 12 further comprises a closed-loop regulator 15 that is capable of determining a reference torque request $m_c$ on the basis of current speed and/or acceleration values detected by the plurality of sensors 22. Such a reference torque request $m_c$, therefore, takes into account the conditions of road surfaces and of the traffic.

Advantageously, the second central control unit 12 comprises a selector unit 16 that verifies that the speed and/or acceleration values detected by the plurality of sensors 22 meet the limit conditions for the speed and/or acceleration determined by the optimization unit 17.

In the case in which the speed and/or acceleration values do not meet such determined limit conditions, the selector unit 16 compares the reference torque $m_c$ with the instantaneous torque $m_d$ requested by a user. If the instantaneous torque request $m_d$ is lower than the reference torque request $m_c$, the second central control unit 12 generates a regulated instantaneous torque request m that is equal to the instantaneous torque request $m_d$ made by the user.

On the other hand, the second central control unit 12 generates a regulated instantaneous torque request m that is equal to the reference torque request $m_c$.

Preferably, the second central control unit 12 also comprises a regulator of the speed/acceleration K(s) that comprises a digital filter that carries out the transfer function of a regulator designed so as to ensure that there is no error when the transient has finished and a suitable response speed. Such a regulator is designed on the basis of a dynamic description of the relationship, identified through experimental tests, which occurs between the instantaneous torque request $m_d$ from the user and the speed/acceleration of the vehicle 20. The speed/acceleration K(s) regulator comprises a speed regulator $K_v(s)$ together with an acceleration regulator $K_{acc}(s)$ in concurrent operation. Both speed Kv(s) and acceleration $K_{acc}(s)$ regulators are of the Proportional-Integral type, so as to ensure that there are no errors when the transient has finished. The acceleration regulator is calibrated, again in the case of an electric vehicle for urban use, so as to ensure a passband of 0.5 Hz, whereas the speed regulator is calibrated so as to obtain a passband of 0.1 Hz.

Figure 2:
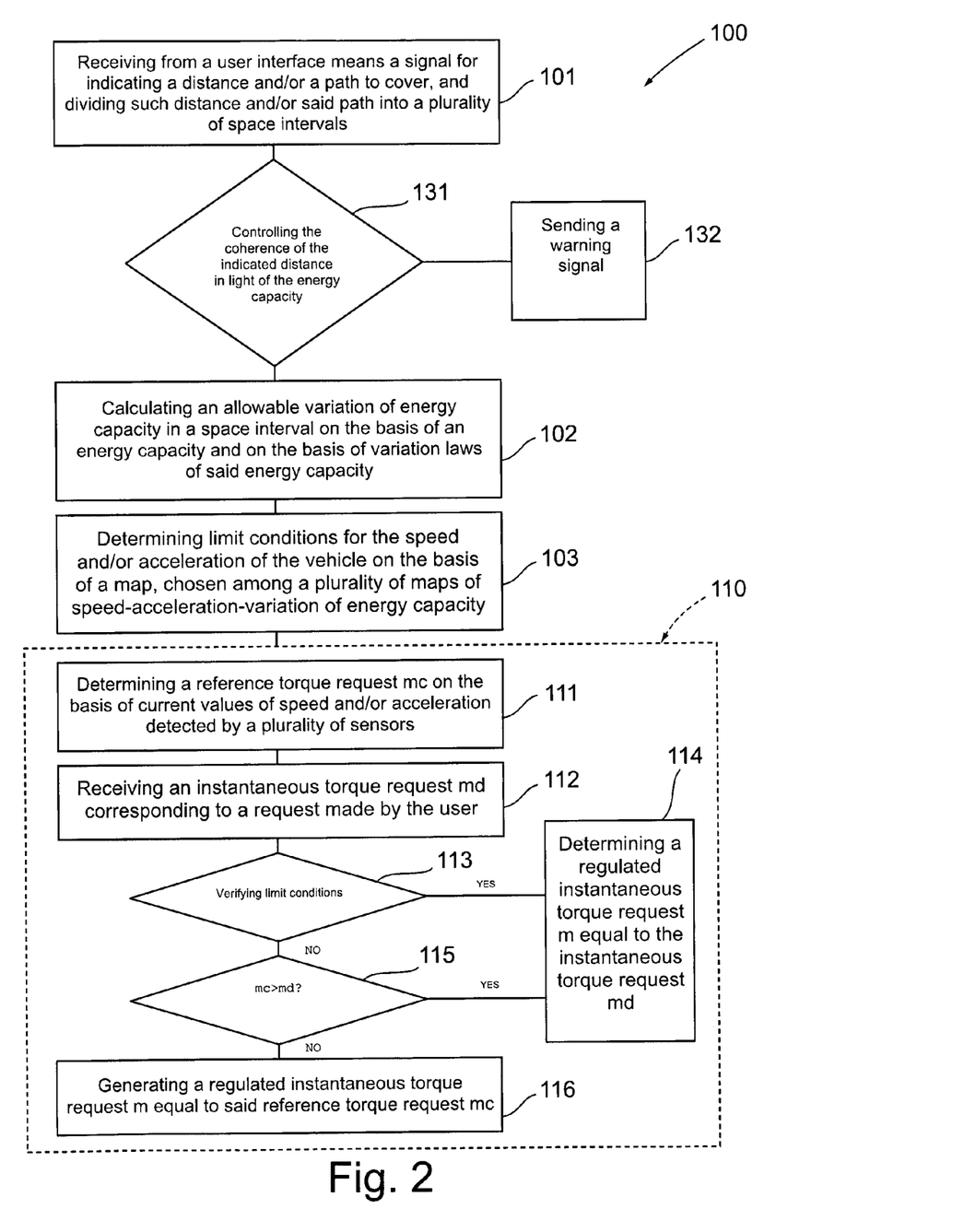
FIG. 2 is a flow chart of one embodiment of the method for the automatic management of the energy autonomy of a vehicle according to the present invention.

The method 100 for the automatic management of the energy autonomy of a vehicle implemented by the electronic system 10 comprises a first phase 101 consisting in receiving a signal for indicating a distance and/or a path to cover and of dividing the aforementioned distance and/or path into a plurality of space intervals.

In such a phase 101 the second control unit 12 receives the indication of the path by the user through the interaction with the interface means 11 and divides the entire path into a plurality of space intervals. Preferably, each space interval is equal to the next and is 50 m long, but it can of course be redefined based upon specific requirements.

Preferably, the receiving phase 101 comprises a phase in which the second control unit 12 also receives a plurality of altimetric data relative to the path to cover.

Preferably, after the receiving phase 101 it is foreseen for there to be a phase 131 consisting in controlling the coherence of the indicated distance and/or path to cover in light of the energy capacity C detected by the plurality of sensors 22. Such a phase of control of coherence 131 is advantageously followed by a phase 132 consisting in sending a warning signal in the case in which there is a negative result of the aforementioned coherence control phase 131, that is when the energy capacity C is deemed by the second central control unit 12 to be insufficient to ensure that the path specified by the user can be completed. In such a case, the warning signal is advantageously received by the interface means 11 from which it can be detected by the user.

In the case in which there is a positive result of the coherence control phase 131, the supervision unit 13 calculates (phase 102), at each space interval, a first allowable variation of energy capacity $\Delta C_1$ on the basis of the energy capacity C detected by the plurality of sensors 22 and on the basis of variation laws of energy capacity C based upon suitable consumption modes, so as to be able to redefine, in real time, the constraints on the dynamics of the vehicle 20 which ensure the completion of the path within the formulated energy capacity C constraints.

Figure 3:
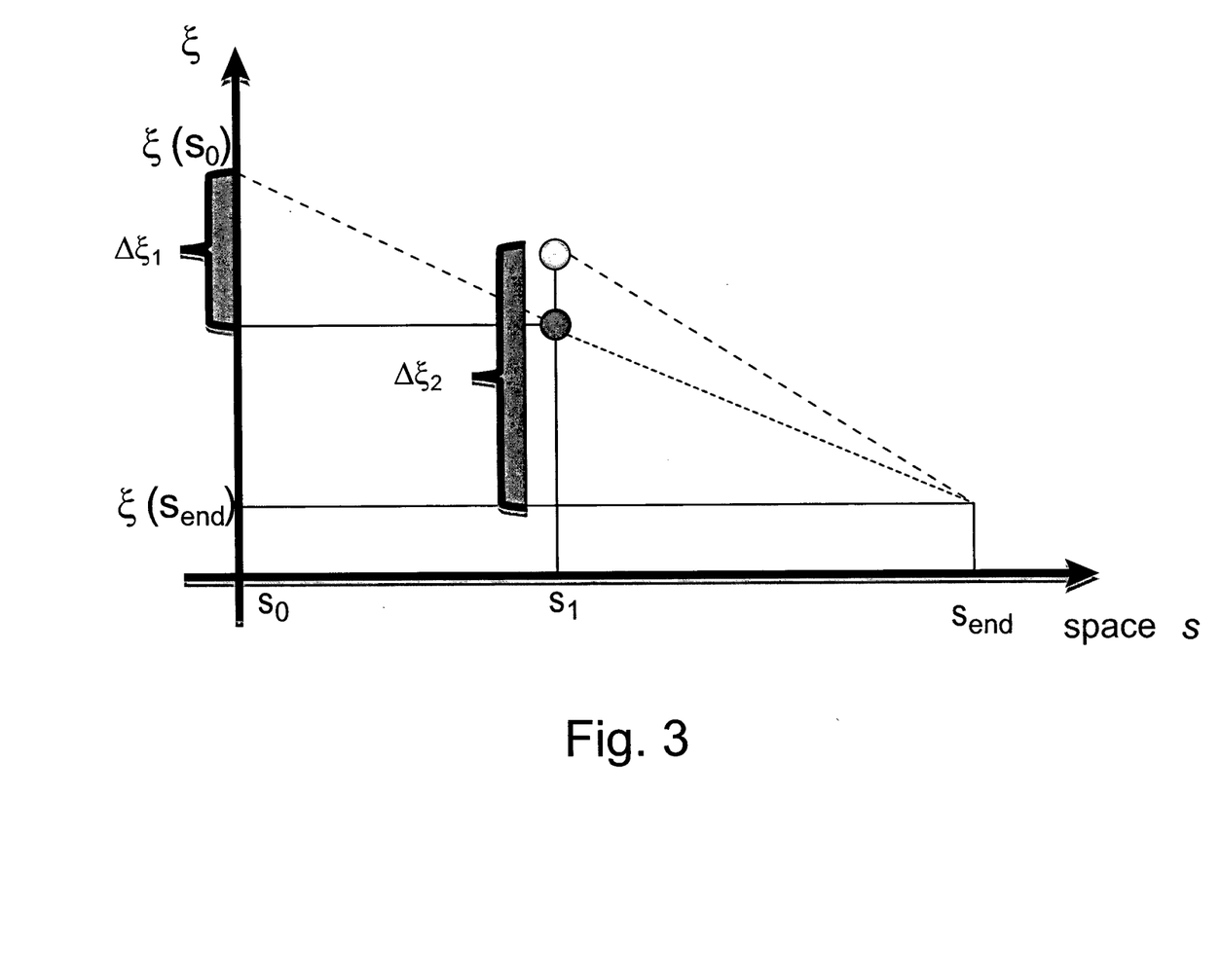
FIG. 3 is a graph representing the energy capacity variation of a vehicle as a function of the space.

Indeed, from the variation law of energy capacity C, being detected the energy capacity C(s0) at the initial space interval s0, the supervision unit 13 is capable of estimating the energy capacity $C(s_{end})$ at the end space interval $S_{end}$ and therefore of calculating a first allowable variation of energy capacity $\Delta C=C(s1)-C(s0)$ for the first space interval $\Delta S1=s1-s0$.

In the same way, the supervision unit 13, at the end of the first space interval $\Delta S1$, determines a second allowable variation of energy capacity $\Delta C_2$ for the subsequent space interval $\Delta S2$.

Such a modality of calculating the allowable variation of energy capacity $\Delta C$ is repeated at each of the plurality of space intervals and makes it possible to correct in real time the requests made to the vehicle as a function of both the variation law of determined energy capacity C, and of the actual traffic conditions encountered by the vehicle which also have an impact on the actual value of the energy capacity C reached by the vehicle.

After the calculation phase 102 of the allowable variation of the energy capacity $\Delta C_i$ for one i-th space interval to cover, it is foreseen for there to be a phase 103 in which the supervision unit 13 defines limit conditions for the speed and/or acceleration of the vehicle 20, on the basis of a map chosen among a plurality of speed-acceleration-energy capacity variation maps which relates the speed and the acceleration of the vehicle 20 to the allowable variation of calculated energy capacity $\Delta C$.

Such speed-acceleration-energy capacity variation maps are obtained on the basis of experimental data and/or mathematical models which relate the power delivered by the torque-controllable motor 21 to the speed and the acceleration of the vehicle detected by the plurality of sensors 22. It is important to underline that the action of the electronic system 10 that carries out a control for the speed and/or for the acceleration of the vehicle 20 can be disabled in any moment by the driver of the vehicle.

Once the limit conditions for the speed and/or acceleration have been determined, a phase 110 is foreseen consisting in generating, through the second control unit 12, a regulated instantaneous torque request m on the basis of the speed and/or acceleration detected by the plurality of sensors 22, of the determined limit conditions for the speed and/or acceleration and of the instantaneous torque request $m_d$ generated by the first central control unit 23.

In detail, such a generating phase 110 of a regulated instantaneous torque request m comprises a phase 111 consisting in determining, through the closed-loop regulator 15, a reference torque request $m_c$ on the basis of current speed and/or acceleration values detected by the plurality of sensors 22.

Subsequently a phase 112 is foreseen consisting in receiving, from the first central control unit 23, an instantaneous torque request $m_d$ corresponding to the request made by the user, for example with the movement of the accelerator.

At this point, the generating phase 110 of a regulated instantaneous torque request m comprises a phase 113 consisting in verifying, through the selector unit 16, that the speed and/or acceleration values detected by the plurality of sensors 22 meet the limit conditions for the speed and/or acceleration determined by the supervision unit 13.

If the limit conditions for the speed and/or acceleration are met, a phase 114 is foreseen consisting in determining a regulated instantaneous torque request m equal to the request $m_d$.

On the other hand, if the limit conditions for the speed and/or acceleration are not met, there is a phase 115 consisting in comparing the reference torque request $m_c$ and the instantaneous torque request $m_d$ made by the user.

In the case in which the instantaneous torque request $m_d$ is lower than the reference torque request $m_c$ the phase 114, of determining a regulated instantaneous torque request m equal to the request $m_d$, is again foreseen.

Otherwise, there is a phase 116 consisting in generating a regulated instantaneous torque request m equal to the reference torque request $m_c$.

Preferably, the method 100 for the automatic management of the energy autonomy of a vehicle in addition comprises the phase (not illustrated) consisting in generating and sending one or more information signals containing indications concerning the covered distance, the consumed energy capacity, the speed of the vehicle and the value of the limitation introduced by the regulated torque request m as a function of the driving style of the user. Such information is received by the interface means 11 which provides for registering them in memory means and for presenting them to the user when required by him/her.

In the case in which the torque-controllable motor 21 is an electric motor, the energy capacity C corresponds to the load state $\xi$ of the battery of the motor itself. In the rest of the description reference is made, as an example and not for limiting purposes, only to the energy capacity $\xi$ of an electric motor. In such a case, the variation law of energy capacity $\xi$ considered by the supervision unit 13 is preferably linear. Such a condition of linearity is used purely as an example and refers to a path that is perfectly flat and without hypothesising lower limits for the minimum speed of the vehicle. Indeed, on highway paths, for example, it could be advantageous to consider discharge profiles which do not foresee minimum speeds below a certain threshold that can be set by the user.

Preferably, in such a case, each of the plurality of speed-acceleration-energy capacity variation maps is obtained through experimental data. In order to obtain such speed-acceleration-energy capacity variation maps, the supervision unit 13 builds a first map of speed-acceleration-power (VAP) delivered by the battery, like the one illustrated in FIG. 4, in which the delivered power $P_{batt}=f(v,a)$ is a function both of the speed and of the acceleration.

Figure 4:
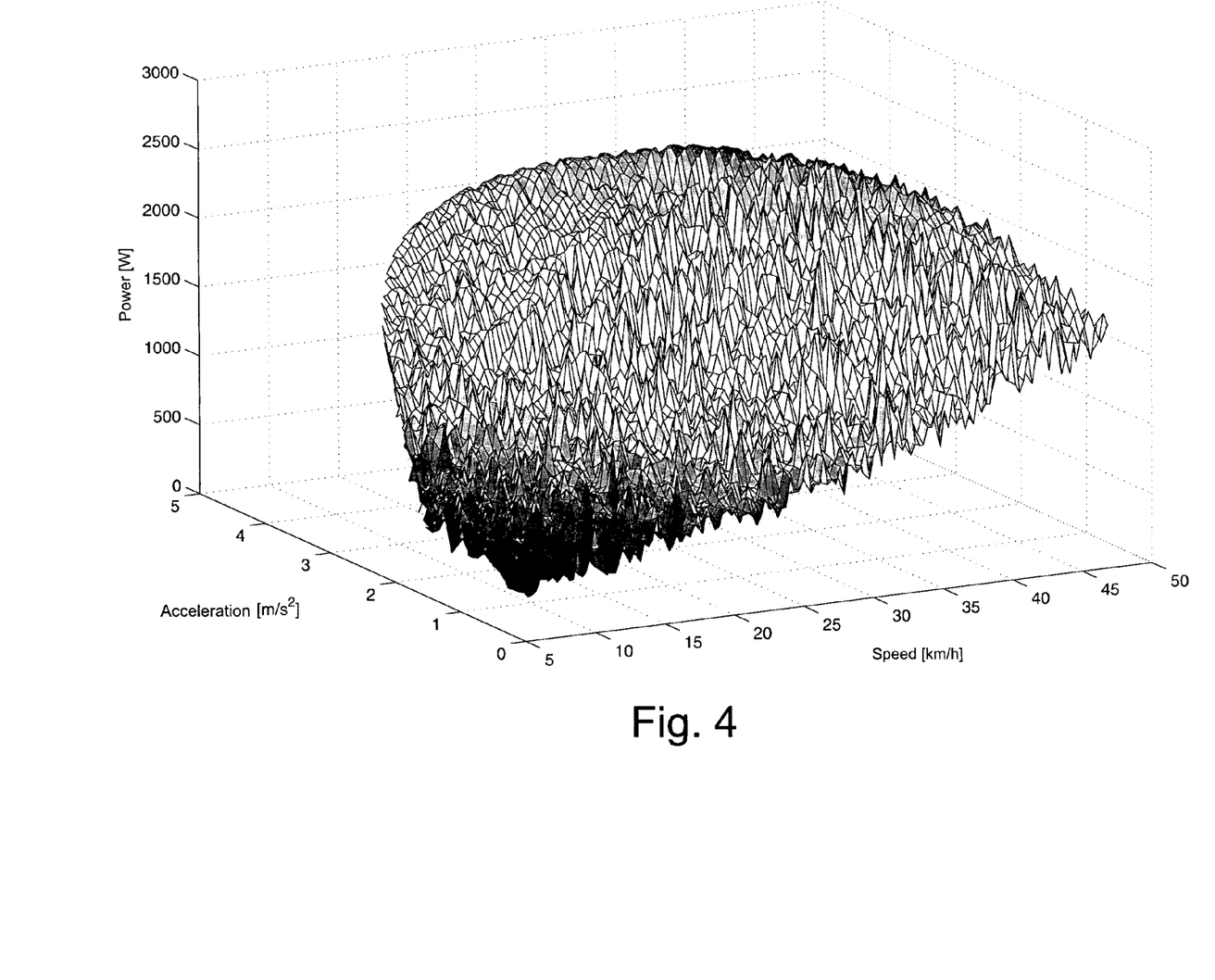
FIG. 4 is one of the possible speed-acceleration-delivered power maps used in the method of FIG. 2.

Such a first VAP map is obtained from the measurements made on board of the vehicle processed through the digital filtering of data. Preferably, such digital filtering is a speed and acceleration filtering of low-pass type, with a cutting frequency of between 0.1 and 0.5 Hz.

We shall now consider the hypothesis of a linear relationship between energy of the battery $e_{batt}$ and load state $\xi$ expressed by the following equation:

$$\xi(t)=\xi(0)-\alpha e_{batt}(t)$$

where $\alpha$ is a real parameter given by the relationship between the total variation of the load state $\Delta\xi$ and the total energy $e_{batt}$ expressed in Wh, delivered by the battery; it is possible to define the variation of the load state $\Delta\xi$ as:

$$\Delta\xi(t)=-\alpha\Delta e_{batt}(t)$$

Since the delivered power $P_{batt}$ is the time derivative of the energy $\Delta e_{batt}$ extracted from the battery, with the suitable replacements it is possible to obtain:

$$P_{batt}(t) = \frac{\Delta e_{batt}(t)}{\Delta t} = -\frac{1}{\alpha}\frac{\Delta\xi(t)}{\Delta t} = -\frac{1}{\alpha}\frac{\Delta\xi(t)}{\Delta t}\frac{\Delta s}{\Delta s} = \frac{\Delta\xi(t)}{\Delta s}\frac{\Delta s}{\Delta t} = -\frac{1}{\alpha}\frac{\Delta\xi(t)}{\Delta s}v(t)$$
$$\Downarrow$$
$$\frac{\Delta\xi(t)}{\Delta s}=-\alpha\frac{P_{batt}(t)}{v(t)}\left[\frac{\%_{sec}}{km}\right]$$

where $\Delta\xi(t)/\Delta s$ represents the relative instantaneous discharge.

Figure 5:
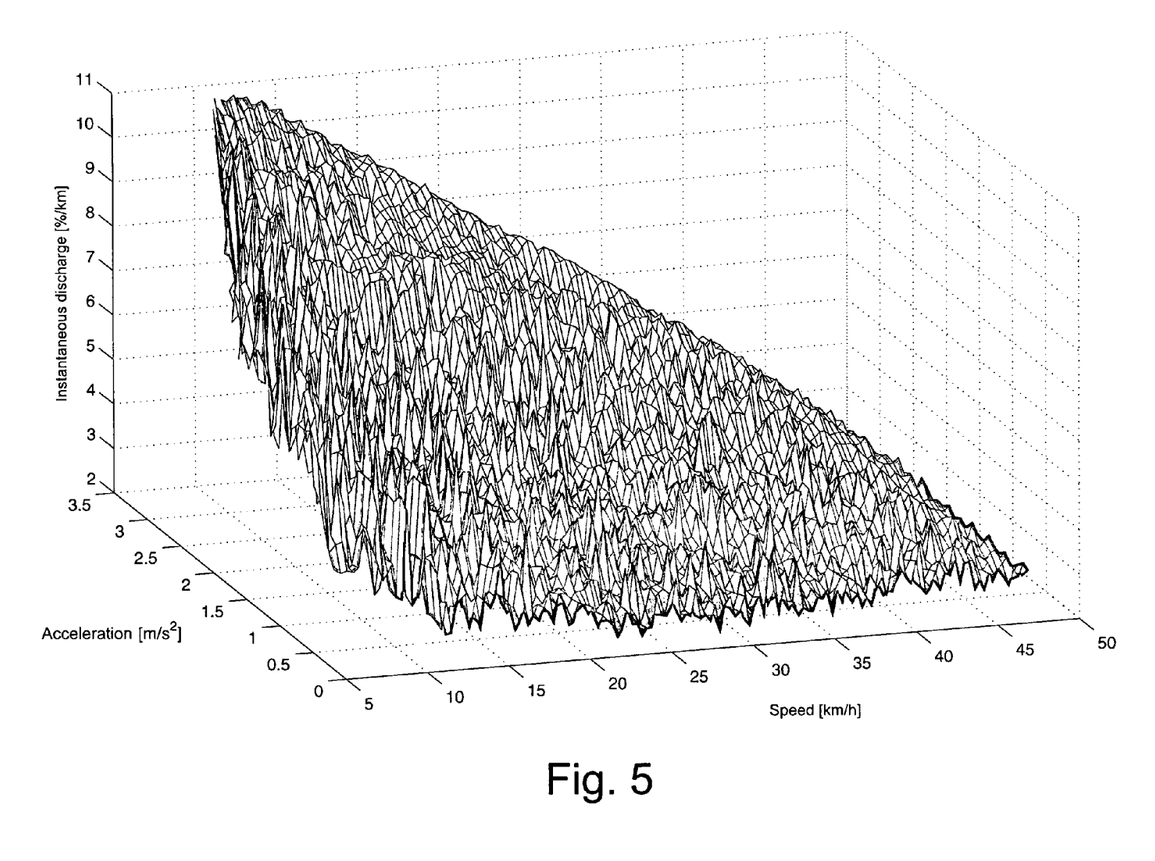
FIG. 5 is one of the possible speed-acceleration-energy capacity variation maps used in the method of FIG. 2.

Each value of extracted delivered power $P_{batt}$ of the first VAP map can thus be divided by the instantaneous speed v and multiplied by the linearity factor $\alpha$, thus leading to a second map of speed-acceleration-variation of energy capacity $\xi$ (VAV) illustrated in FIG. 5.

Figure 6:
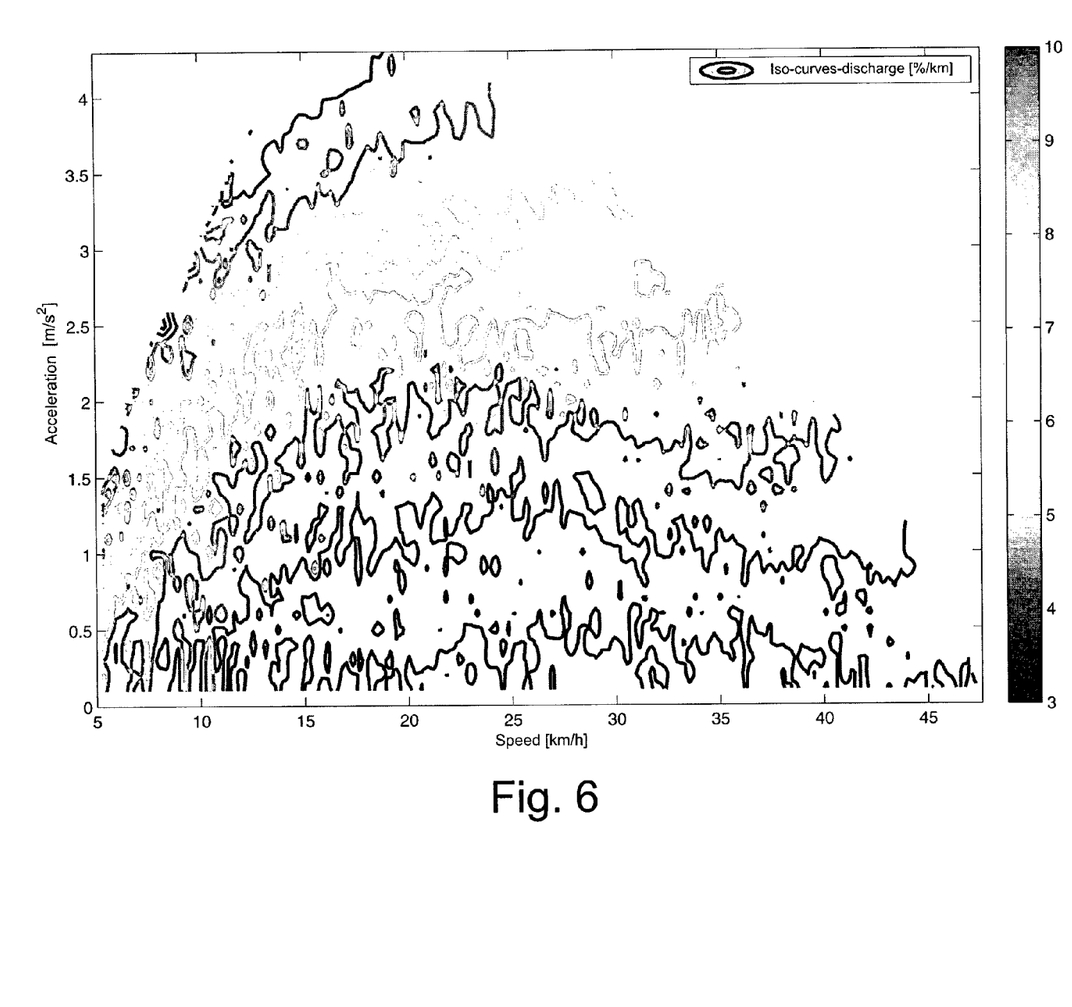
FIG. 6 is one of the possible level curves deriving from the speed-acceleration-energy capacity variation maps of FIG. 5.

From the second VAV map the supervision unit 13 obtains level curves, like those shown in FIG. 6, which represent an "experimental" relationship between speed and acceleration.

Such level curves relate speed to acceleration of the vehicle 20 and are variable with the allowable variation of energy capacity $\xi$.

From the VAV maps, once the speed of the vehicle is known instant by instant, it is possible to read the maximum acceleration value $a_{max}$ corresponding to such a speed value. Such a maximum acceleration value $a_{max}$ is indeed the limit value which generates the limit condition on the acceleration to be imposed on the vehicle through the second central control unit 12 so as to ensure that the dynamic behaviour of the vehicle 20 ensures the desired autonomy.

It is clear, in the case in which the torque-controllable motor 21 is an electric motor, that the constraints are essential for determining the autonomy of the vehicle itself since the speed and acceleration have a crucial impact on the amount of battery charge necessary to cover a predetermined path: the inertial mechanical and aerodynamic power are indeed directly related to the energy taken from the battery.

Analogously, the VAV maps provide the value of the maximum speed $v_{max}$ that generates the limit condition for the speed to be imposed on the vehicle by means of the second central control unit 12.

It should be underlined that the second central control unit 12 can act by regulating both the speed and the acceleration of the vehicle.

Moreover, the limit conditions for the speed and acceleration of the vehicle 20 are generated by using suitable digital filters which make it possible to make gradual the corresponding variations of speed and/or acceleration set by the second control unit 12 and thus make them as much as possible unperceivable to the driver.

The filtering is carried out through low-pass digital filter, the order and cut-off frequency of which are selected based upon dynamics of the closed-loop system ensured by the speed/acceleration regulator K(s). For example, in the case of an electric vehicle for urban use, a low-pass filter of the first order can be selected with a passband comprised between the frequencies of 0.05 and 0.5 Hz.

Such a provision is necessary in order to ensure the acceptability of the electronic system 10 by the driver and therefore to maximise the transparency that such a system has with respect to the driver himself.

From the present description the characteristics of the method and of the electronic system for the automatic management of the energy autonomy of a vehicle object of the present invention should be clear, just as the relative advantages should also be clear.

Indeed, the method according to the present invention makes it possible to substantially minimise the potential inconvenience due to the limited energy autonomy of a vehicle. The generation of a regulated instantaneous torque request on the basis of the energy capacity of the vehicle which can be consumed in a space interval makes it possible to ensure that a desired path can be covered.

The electronic system, moreover, thanks to the presence of the supervision unit, makes it possible to inform the user on whether the energy capacity of the vehicle is sufficient in relation to the distance and/or to the path that is desired to be covered with the vehicle itself.

Since the supervision unit recalculates in real time the allowable variation in energy capacity for the space interval that is about to be run, the electronic system for the automatic management of the energy autonomy of a vehicle is capable of modifying the driving style of the generic user also based upon the traffic conditions and upon the road surface.

It is also important to underline that the electronic system and the method according to the present invention can be applied both to vehicles with electric motor, and to those equipped with a conventional thermal or hybrid motor, thus being of wide interest in the field of sustainable mobility. In the case of a vehicle comprising a thermal motor, the monitoring of the consumptions and of the autonomy available mainly has a monitoring function of the driving style which could be of interest to the user so as to be able to modify the way in which he drives the vehicle and to learn behaviour that minimises fuel consumption and that increases on-board safety.

Finally, it should be clear that the method and the electronic system for the automatic management of the energy autonomy of a vehicle thus conceived can undergo numerous modifications and variants, all covered by the invention; moreover, all the details can be replaced by technically equivalent elements. In practice, the materials used, as well as the sizes, can be any according to the technical requirements.

The invention claimed is:

1. A method (100) for the automatic management of the energy autonomy of a vehicle of the type comprising a torque-controllable motor (21), a plurality of sensors (22) for the instantaneous measurement of a plurality of drive parameters and of energy capacity (C) of said vehicle, and a first central control unit (23) coupled with said motor (21), capable of generating an instantaneous torque request (md) on the basis of a request of a user, wherein the method (100) comprises phases of:
    receiving (101) from a user interface means (11) a signal for indicating a distance and/or a path to cover, and dividing such distance and/or said path into a plurality of space intervals;
    calculating (102) an allowable variation of energy capacity ($\Delta C$) in a space interval on the basis of an energy capacity (C) detected by said plurality of sensors (22) and on the basis of variation laws of said energy capacity (C);
    determining (103) limit conditions for the speed and/or acceleration of said vehicle (20) on the basis of a map, chosen among a plurality of maps of speed-acceleration-variation of energy capacity, which relates the speed and the acceleration of said vehicle (20) with the variation of the calculated energy capacity ($\Delta C$);
    generating (110) a regulated instantaneous torque request (m) on the basis of the speed and/or acceleration detected by said plurality of sensors (22), of said determined limit conditions for the speed and/or acceleration and of said instantaneous torque request ($m_d$) generated by said first central control unit (23), wherein said generating phase (110) of a regulated instantaneous torque request (m) comprises phases of:
    determining (111) a reference torque request ($m_c$) on the basis of current values of speed and/or acceleration detected by said plurality of sensors (22);
    receiving (112) from said first central control unit (23) an instantaneous torque request (md) corresponding to a request made by the user;
    verifying (113) that the current values of speed and/or acceleration detected by said plurality of sensors (22) meet said determined limit conditions for the speed and/or acceleration;
    if said limit conditions for the speed and/or acceleration are met, determining (114) a regulated instantaneous torque request (m) equal to the instantaneous torque request ($m_d$);
    if said limit conditions for the speed and/or acceleration are not met, comparing (115) said reference torque request ($m_c$) with said instantaneous torque request ($m_d$);
    in case said instantaneous torque request ($m_d$) is lower than said reference torque request ($m_c$), determining (114) a regulated instantaneous torque request (m) equal to said instantaneous torque request ($m_d$);
    in case said instantaneous torque request ($m_d$) is greater than said reference torque request ($m_c$), generating (116) a regulated instantaneous torque request (m) equal to said reference torque request ($m_c$).

2. The method (100) for the automatic management of the energy autonomy of a vehicle according to claim 1, characterized in that said receiving phase (101) further comprises a phase comprising receiving a plurality of altimetric data relating to said distance and/or path to cover.

3. The method (100) for the automatic management of the energy autonomy of a vehicle according to claim 1, characterized in that the method further comprises phases of:
    controlling (131) the coherence of said indicated distance and/or path to cover in light of said energy capacity (C) detected by said plurality of sensors (22),
    sending (132) a warning signal in case of a negative result of said phase of control of coherence (131), that is when said detected energy capacity (C) is deemed to be insufficient to ensure the run of said indicated distance and/or path to cover.

4. The method (100) for the automatic management of the energy autonomy of a vehicle according to claim 1, characterized in that said plurality of speed-acceleration-variation of energy capacity maps is obtained on the basis of experimental data and/or mathematical models which relate the power delivered by said torque-controllable motor (21) with said speed and said acceleration of the vehicle detected by said plurality of sensors (22).

5. The method (100) for the automatic management of the energy autonomy of a vehicle according to claim 4, characterized in that, in case said torque-controllable motor (21) is an electric motor and said energy capacity (C) is a load state ($\xi$) of a battery of said electric motor, the method further comprises phases of:
    building a first map of speed-acceleration-power (VAP) delivered by said battery, wherein the delivered power $P_{batt}=f(v, a)$ is a function both of the speed and of the acceleration on the basis of measurements made on board of said vehicle (20) processed through a digital filtering of data;

determining a second map of speed-acceleration-variation of energy capacity (VAV);
obtaining level curves of speed-acceleration in function of said energy capacity variation.

6. The method (100) for the automatic management of the energy autonomy of a vehicle according to claim 5, characterized in that said digital filtering of data is a speed and acceleration filtering of the low-pass type, with a cutting frequency between 0.1 and 0.5 Hz.

7. The method (100) for the automatic management of the energy autonomy of a vehicle according to claim 5, further comprising a phase of generating and sending at least one information signal comprised in the group of:
covered distance,
consumed energy capacity,
speed of said vehicle, and
value of the limitation introduced by said regulated instantaneous torque request (m).

8. The method (100) for the automatic management of the energy autonomy of a vehicle according to claim 1, characterized in that said limit conditions for the speed and acceleration of said vehicle (20) are generated by using digital filters capable of making the regulations gradual and as much as possible unperceivable for said user.

9. A computer program directly chargeable in the internal memory of a digital computer, comprising code portions for implementing a method (100) for the automatic management of the energy autonomy of a vehicle when said program is actuated by said computer, wherein said method is capable of generating an instantaneous torque request (md) on the basis of a request of a user for a vehicle of the type comprising a torque-controllable motor (21), a plurality of sensors (22) for the instantaneous measurement of a plurality of drive parameters and of energy capacity (C) of said vehicle, and a first central control unit (23) coupled with said motor (21), wherein the method (100) comprises phases of:
receiving (101) from a user interface means (11) a signal for indicating a distance and/or a path to cover, and dividing such distance and/or said path into a plurality of space intervals;
calculating (102) an allowable variation of energy capacity ($\Delta C$) in a space interval on the basis of an energy capacity (C) detected by said plurality of sensors (22) and on the basis of variation laws of said energy capacity (C);
determining (103) limit conditions for the speed and/or acceleration of said vehicle (20) on the basis of a map, chosen among a plurality of maps of speed-acceleration-variation of energy capacity, which relates the speed and the acceleration of said vehicle (20) with the variation of the calculated energy capacity ($\Delta C$);
generating (110) a regulated instantaneous torque request (m) on the basis of the speed and/or acceleration detected by said plurality of sensors (22), of said determined limit conditions for the speed and/or acceleration and of said instantaneous torque request (ma generated by said first central control unit (23), wherein said generating phase (110) of a regulated instantaneous torque request (m) comprises phases of:
determining (111) a reference torque request ($m_c$) on the basis of current values of speed and/or acceleration detected by said plurality of sensors (22);
receiving (112) from said first central control unit (23) an instantaneous torque request (md) corresponding to a request made by the user;
verifying (113) that the current values of speed and/or acceleration detected by said plurality of sensors (22) meet said determined limit conditions for the speed and/or acceleration;
if said limit conditions for the speed and/or acceleration are met, determining (114) a regulated instantaneous torque request (m) equal to the instantaneous torque request ($m_d$);
if said limit conditions for the speed and/or acceleration are not met, comparing (115) said reference torque request ($m_c$) with said instantaneous torque request ($m_d$);
in case said instantaneous torque request ($m_d$) is lower than said reference torque request ($m_c$), determining (114) a regulated instantaneous torque request (m) equal to said instantaneous torque request ($m_d$);
in case said instantaneous torque request ($m_d$) is greater than said reference torque request ($m_c$), generating (116) a regulated instantaneous torque request (m) equal to said reference torque request ($m_c$).

10. An electronic system (10) for the automatic management of the energy autonomy of a vehicle of the type comprising a torque-controllable motor (21), a plurality of sensors (22) for the instantaneous measurement of a plurality of drive parameters and of energy capacity of said vehicle, a data network capable of transmitting digital and/or analog signals, a first central control unit (23) coupled with said motor (21), capable of generating an instantaneous torque request (md) on the basis of a request of a user, wherein said electronic system (10) for the automatic management of the energy autonomy of a vehicle comprises:
a user interface means (11) capable of transmitting a signal indicating a distance and/or a path to cover by said user;
a second central control unit (12) connected to said interface means (11) in order to receive a signal indicating a distance and/or a path to cover, said second central control unit (12) being capable of generating a regulated instantaneous torque request (m) on the basis of said indicated distance and/or path to cover, of the speed and/or acceleration and of the energy capacity (C) detected by said plurality of sensors (22) and of said instantaneous torque request (md) generated by said first central control unit (23).

11. The electronic system (10) for the automatic management of the energy autonomy of a vehicle according to claim 10, characterized in that said second central control unit (12) comprises:
a supervision unit (13) capable of calculating, in real time and at the initial point of each interval among a plurality of space intervals which said indicated distance and/or path to cover is fractioned in, an allowable variation of energy capacity ($\Delta C$ of said motor (21), on the basis of the values of energy capacity (C) detected by said plurality of sensors (22);
an optimization unit (17) capable of determining limit conditions for the speed and/or acceleration which said vehicle (20) must respect within the nearest space interval, on the basis of a plurality of speed-acceleration-variation of energy capacity maps;
memory means (14) connected to said optimizing unit (17);
a closed-loop regulator (15) capable of determining a reference torque request ($m_c$) on the basis of current speed and/or acceleration values detected by said plurality of sensors (22);
a selector unit (16) capable of verifying that the speed and/or acceleration values detected by the plurality of sensors (22) meet said limit conditions for the speed and/or acceleration determined by the optimization unit (17), and of comparing said reference torque request ($m_c$) with said instantaneous torque request ($m_d$).

12. The electronic system (10) for the automatic management of the energy autonomy of a vehicle according to claim 10, characterized in that said user interface means (11) comprises a supervision unit (13) capable of calculating, in real time and at the initial point of each interval among a plurality of space intervals which said indicated distance and/or said path to cover are fractioned in, an allowable variation of energy capacity ($\Delta C$) of said motor (21), on the basis of the values of energy capacity (C) detected by said plurality of sensors (22).

13. The electronic system (10) for the automatic management of the energy autonomy of a vehicle according to claim 10, comprising two wireless transceiver means (31, 32) respectively associated, the first one (31) with said interface means (11) and the second one (32) with said second central control unit (12).

14. The electronic system (10) for the automatic management of the energy autonomy of a vehicle according to claim 10, characterized in that said interface means (11) is integrated in said vehicle (20) and is connected to said second central control unit (12).

15. The electronic system (10) for the automatic management of the energy autonomy of a vehicle according to claim 10, characterized in that said interface means (11) is a mobile terminal capable of communicating with said second central control unit (12) according to the Bluetooth standard.

16. The electronic system (10) for the automatic management of the energy autonomy of a vehicle according to claim 10, characterized in that said interface means (11) comprises memory means for registering road maps and altimetric data, and software means capable of generating said signal for the indication of said distance and/or said path on the basis of said maps and of the requests by said user.

* * * * *